United States Patent Office 3,456,558
Patented July 22, 1969

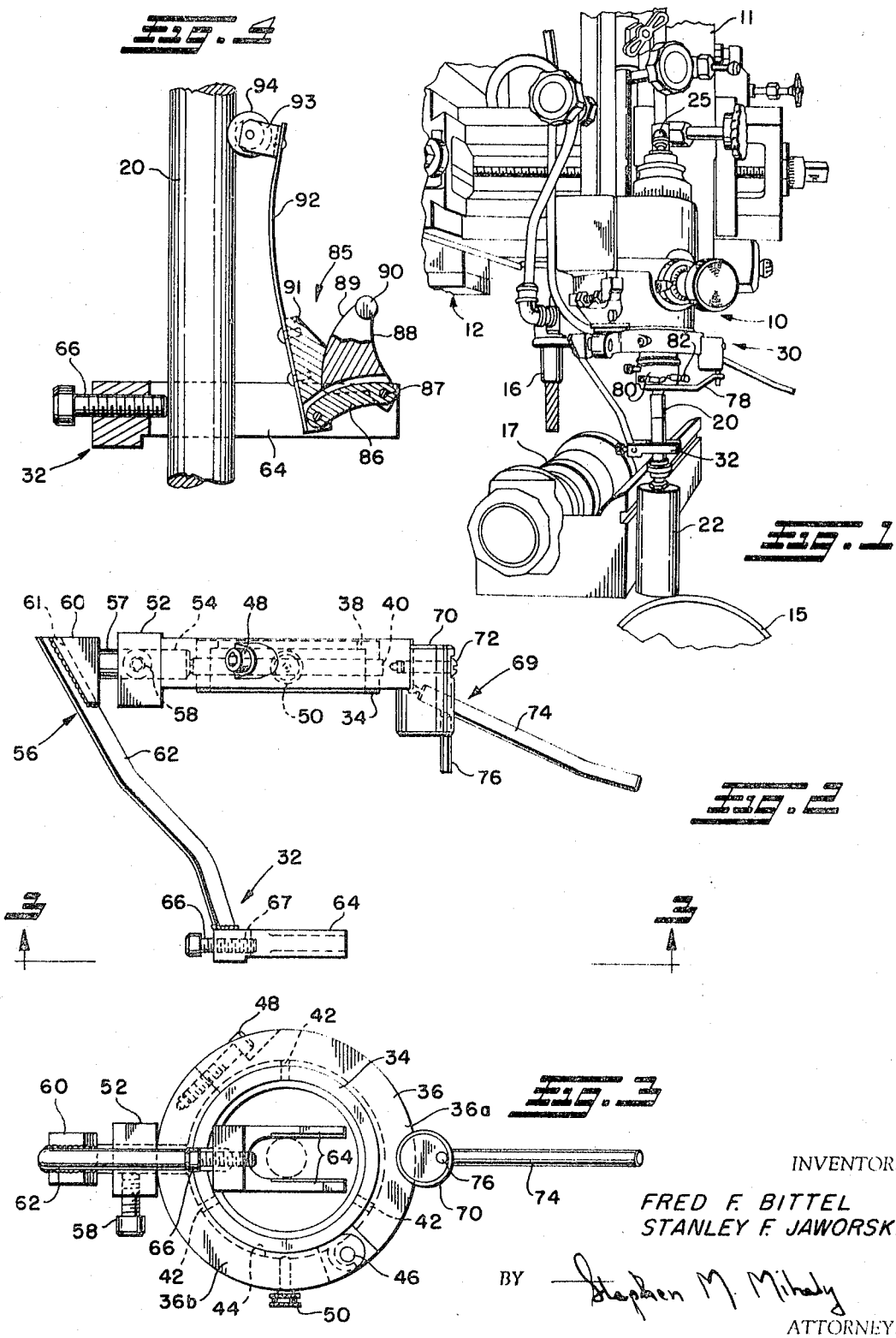

3,456,558
TRACER GUIDE
Fred F. Bittel, Maple Heights, and Stanley F. Jaworski, Garfield Heights, Ohio, assignors to The Cleveland Pneumatic Tool Company, Cleveland, Ohio, a corporation of Ohio
Filed Sept. 18, 1967, Ser. No. 668,352
Int. Cl. B23c 9/00
U.S. Cl. 90—62
6 Claims

ABSTRACT OF THE DISCLOSURE

Apparatus coupled to a tracer mechanism to guide movement of the tracer stylus consisting of a swivel coupling attached to the tracer mechanism and carrying a forked member and an adjustment screw which engage the tracer stem to restrict movement in a selected direction through a predetermined displacement.

---

This invention relates to tracer apparatus and more particularly to a tracer guide or override prevention apparatus for use in conjunction with tracer mechanisms to prevent accidental movements of the tracer stylus by the operator of the machine.

Tracer mechanisms are commonly used in conjunuction with lathes, milling, grinding, profiling and many other type machines wherein it is desired to reproduce the shape of a master part or the profile of a template onto a particular workpiece. Most recent embodiments of tracer apparatus employ hydraulic servo valves for recognizing the movement of the tracer stylus as it is traversed over a template for controlling the operation of any particular machine. Some of these tracer mechanisms are operated in an automatic mode wherein a certain direction of travel is preselected and the stylus automatically follows the template in such preselected direction to control movement of the machine. Other tracer mechanisms require that an operator be present to select the desired path of travel and control the rate of metal removal by the rapidity of the traverse of the template.

In particular, with regard to milling machines it is common to have an operator in attendance to perform the tracing opertion where three-dimensional profiles are desired to be reproduced on the workpiece. It is also known to control a plurality of milling machines under the direction of a single tracer attachment controlled by the operator. Thus, it has become necessary in these environments to have an expert operator controlling the machine who has had much practice in selecting the predetermined path of travel of the stylus and in judging the rate of travel to be employed to remove the most amount of metal in the least amount of time, thereby utilizing the machine at its greatest efficiency. One of the problems encountered with this type of machine is that it is relatively difficult and expensive to train an inexperienced operator in the efficient use of these machines since errors in judgment or accidental movements of the tracer stylus cause a great amount of wastage.

It would be quite a simple solution to this problem to mechanically restrict the operator's movement to predetermined minimal standards. However, as can readily be appreciated, there are situations wherein this solution becomes impractical due to the limited amount of work that can be performed. Thus for instance, in feeding along a particular traverse it may become necessary to engage the machine in a rapid traverse movement to advance between selected cutting areas. Also, it is desirable to allow the operator to retain control over a reverse movement of a machine at either a feeding rate or in rapid traverse motion to allow the quick withdrawal of a tool from within the machining area.

Still another problem encountered with three-dimensional tracer attachments is the requirement that feeding take place along a substantially straight predetermined line of travel. Such skill, although possible with expert operators of these machines, is relatively difficult and expensive to imbue in an inexperienced operator.

Therefore, it is an object of this invention to provide apparatus which may be used in conjunction with tracer attachments to aid the operator in the use of such attachments and to provide limiting movements in predetermined directions.

It is another object of this invention to provide apparatus which restricts the movement of a tracer stylus to a single predetermined direction which allows the operator to maintain a desired path of travel.

It is still another object of this invention to provide apparatus which limits the rate of travel of the machine under the control of tracer apparatus to a predetermined rate while allowing a full control including a rapid traverse movement in the reverse direction.

It is a further object of this invention to provide apparatus for use in conjunction with tracer mechanisms which is adjustable to select one of a plurality of predetermined paths of travel and may be conveniently utilized by the operator as desired to control the machine movement.

It is a still further object of this invention to provide tracer guide apparatus which may be utilized with many types of tracer mechanisms and which is readily attached without interconnection to the interior mechanisms of the tracer apparatus.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is an elevational view showing the apparatus of the invention in conjunction with a tracer on a portion of a milling machine;

FIG. 2 is a side view of the apparatus of the invention;

FIG. 3 is a bottom view of the apparatus of the invention, showing the relative location of the tracer stylus in dashed lines; and FIG. 4 is an enlarged side view of an automatic biasing arrangement of the invention.

Referring now to FIG. 1, there is shown a tracer 10 attached to a movable slide 11 of a milling machine 12 and operable to control such slide 11 in response to being traversed over the profile of a master part 15. The tracer 10 controls a cutting tool 16 for performing a machining operation on a workpiece 17, the tool 16 being carried by a machining head on the slide 11 or by a slide movable in synchronism with the slide 11. Such slides are capable of three-dimensional movements, enabled by a conventional triad of mutually orthogonal linear slides. Although only a portion of the milling machine 12 is shown in this drawing, such machine may have a plurality of machining heads controlled by the tracer 10 for simultaneous operations upon a plurality of workpieces disposed in convenient relationship to the machining heads. Similarly, although a milling machine is shown, it will be understood that the teachings of this invention are applicable as well in conjunction with many other types of machines.

The tracer attachment 10 shown in this embodiment of the invention is an H. and H. Wilson, Inc. Crescent 3–D Tracer which provides a simultaneous control over three axes of the machine tool, but it will be understood also that the apparatus of the invention may be used with other types of tracers. The tracer 10 comprises three hydraulic valves (not shown) whose spools are moved in response to the movement of the stem 20 of the tracer 10 to provide control over the fluid flow to the hydraulic actuating elements for the respective slides of the machine tool, as well understood in the art. The tracer 10 further includes a stylus 22 rigidly affixed to the stem 20 which is thereby guided over the profile of the master part 15 to provide the necessary combinations of movement of the slides of the machine tool to reproduce the profile of the master part 15 on the blanks to be machined. The stylus 22 of the tracer attachment 10 in this configuration is adapted to be grasped by the operator of the machine and caused to be moved over the profile of the master part 15. It is characteristic in the operation of this tracer attachment 10 and of many similar tracer attachments that a slight displacement of the stylus 22 and stem 20 in a particular direction will cause the openings of the corresponding valve and a movement of the respective slide of the machine. Since the tracer attachment 10 is also carried by the slides of the machine, it will undergo the same displacement as the slides and thus will follow the movement of the stylus 22 under the direction of the operator. It will, of course, be appreciated that such movement is not restricted to only a single direction but might be a combination of movements in mutually orthogonal directions.

In this particular tracer attachment 10 the movement of the machine tool slides are directly proportional to the movement of the stylus 22 by the operator and thus, the operator has a measure of control over the feed rate of the machining operation and of the amount of material being removed. It is clear that it would be easily possible to limit the maximum feed rate of the slides in all directions so that excessive machining might not be attempted with a consequent dulling or damaging of the tool 16 and/or of the workpiece 17, by merely limiting the rate of fluid flow from the hydraulic valves of the tracer attachment and thus the rate of movement of the machine tool slides. However, as has been indicated previously, such overall control is inefficient since it individually controls the rate of movement of each slide while not compensating for the combinational type movements employed in contouring operations and additionally, does not conveniently allow the operator to rapidly move the machine tool slides under control of the tracer attachment over non-machining areas.

The particular tracer attachment 10 described in conjuntion with the apparatus of this invention employs an internal rapid traverse control of the machine tool slides by sensing excessive movement of the stem 20 in a particular direction. Such excessive movement of the stem 20 causes the slides to transfer immediately from a feeding rate to a rapid traverse rate and the reverse is true when the operator moves the stem 20 to a neutral position or to a position within the feed rate range of the tracer attachment 10. The tracer 10 includes an override adjustment control operated by a knurled knob 25 for setting the amount of pressure required of the operator to move the stem 20 sufficiently to place it in the range of displacement wherein the rapid traverse movement is actuated. This control enables the operator to set the pressure to suit his "feel"; however, it will be appreciated that the operator can only attain proficiency with this type of device after many hours of experience. Additionally, it will be noted that unpreventable accidental movements of the operator will cause a switching into the rapid traverse mode and a consequent damaging of the tool 16 and/or of the workpiece 17. Similarly, it is seen that in certain feeding operations wherein the operator desires to move the stylus 22 over the profile of the master part 15 in a series of parallel straight line movements it is difficult to attain such movements at a desired rate due to the varying reaction forces of the workpiece 17 along the traverse and the different quantities of metal being removed.

The apparatus of the invention consists of an upper base member 30 adapted for attachment to the tracer 10 and a lower forked member 32 attached to the base member 30 and adapted to engage a section of the stem 20 of the tracer 10. As seen more clearly in FIG. 3, the upper base member 30 comprises an inner ring 34 and an outer ring 36 wherein the outer ring 36 is adapted to slide circumferentially relative to the inner ring 34 or to be clamped in any desired relative position. The inner ring 34 is of rigid material, preferably steel, although many other materials could be employed, having an upper lip 38 extending a short distance within the inner area of the ring 34 and an annular projection 40 disposed concentrically with the ring 34 and extending a short distance beyond its periphery. The inner ring 34 may most conveniently be machined from a single piece of material to provide this preferred structure. Located about the inner ring 34 at three locations are tapped openings 42 which retain set screws and which are provided to securely affix the inner ring 34 to a portion of the tracer 10. The upper lip 38 of the inner ring 34 is provided as a seat for engaging a portion of the tracer 10 and for maintaining the apparatus of the invention approximately concentric with the center line of the stem 20 of the tracer 10.

The outer ring 36 consists of two sections, 36a, 36b and has a groove 44 formed in its inner periphery of the same dimensions as the projection 40 of the inner ring 34. The two sections 36a, 36b of the outer ring 36 are joined at one point for pivotal movement by a friction pin 46 and fixed together at a second location approximately 180° disposed therefrom by a screw 48 threaded into a tapped opening disposed tangentially in the outer ring 36. The outer ring 36 is adapted to be opened by removing the screw 48, for placement about the inner ring 34 and thereafter to be clamped in position by the screw 48. The relative diameters of the mating portions of the inner and outer rings 34, 36 are such that when the screw 48 is tightened a snug fit is established while still allowing relative sliding movement of the outer ring 36 in a circumferential direction. A screw 50 having a knurled knob is threaded into a tapped radial opening in the outer ring 36 such that the end of the screw 50 engages the outer periphery of the inner ring 34 to provide a friction clamp for preventing relative movement of the rings 34, 36.

A block 52 of generally circular cross section is affixed to the outer periphery of the outer ring 36 by welding or the like for mounting of the lower forked member 32 in relation to the upper base member 30. The circular block 52 contains a radially extending bore 54 for receiving the extension member 56 which supports the lower forked member 32. The extension member 56 consists of a rod 57 adapted to be located in the bore 54 of the circular block 52 and to be retained in location therein by a knurled set screw 58. The rod 57 is affixed to a block 60 of generally triangular configuration and containing an arcuate groove 61 which receives an extension bar 62 and which is secured thereto by welding or the like. The extension bar 62 is of a bent configuration and has the lower forked member 32 secured thereto by welding, the bends and the length of the extension bar 62 being such as to place the desired operating location of the lower forked member 32 in a preferred relationship with regard to the stem 20 of the tracer 10. Thus, as will be pointed out in greater detail hereinafter, the prongs 64 of the forked member 32 are adapted to lie in a plane perpendicular to the line of the normal position of the stem 20 of the tracer 10 and are of such a spacing as to slidingly engage the outer periphery of the stem 20 and thereby restrict the movement of the stylus 22 in a single direction. A bolt 66 is received in a tapped hole 67 in the base of the lower forked member 32 about midway between the prongs 64 and extending parallel with the prongs 64.

Thus, the configuration of the apparatus of the invention in relation to the stem 20 of the tracer 10 when such stem 20 is in the unoperated position is as is seen in FIG. 3 with the prongs 64 of the lower forked member 32 engaging the sides of the stem 20 and providing a small distance between the stem 20 and the end of the bolt 66 threaded in the forked member 32. The distance between the stem 20 and the bolt 66 may be varied merely by rotating the bolt 66 to alter its penetration through the forked member 32.

Also located on the periphery of the outer ring 36, displaced approximately 180° from the location of the extension member 56 is a pilot structure 69 consisting in part of a second circular block 70 milled at one portion to engage the outer ring 36 and retained in position on the outer ring 36 by a screw 72. The pilot structure 69 further includes a visual guide bar 74 which is fixedly retained within the circular block 70 and extends in a radially outwardly and downwardly direction to provide a means for turning the outer ring 36 and for gauging the relative angles between the inner and outer rings 34, 36. A short pin 76 is also fixedly retained in the circular block 70 and depends vertically therefrom to engage a hole in the bias control arm 78 of the tracer 10 as seen in FIG. 1.

Thus it may readily be seen that the operation of the apparatus of the invention in relation to a particular machine movement would be as follows: If it is desired to trace a profile along a straight line in any one particular direction, the operator need only release the knurled knob 50 to permit relative movement between the inner and outer rings 34, 36, whereby the outer ring 36 may be rotated. Such rotation will cause a corresponding rotation of the lower forked member 32, through the connection of the extension member 56, about the circumference of the stem 20 of the tracer 10. When the desired angle or direction of tracing is attained, the knurled knob 50 is turned in to lock the outer ring 36 and the lower forked member 32 in position. Machine and tool 16 movement is then caused to occur by the manual movement of the stylus 22 along the profile of the master part 15 and of the stem 20 through the space between the stem 20 and the end of the bolt 66 threaded in the forked member 32. The bolt 66 is adjusted so that displacement of the stem 20 into contact with the end of the bolt 66 will create insufficient force to cause the tracer 10 to switch over to its rapid traverse mode of operation.

It is seen, of course, that the stem 20 may, at any time, be moved in a reverse direction in an amount up to and including the rapid traverse mode so that the cutting tool 16 may be backed off from the workpiece 17 at a controlled rate or in rapid traverse if such motion is desired. It is also seen that since the prongs 64 of the lower forked member 32 restrict any sideways movement of the stem 20 that a straight line of travel of the cutting tool 16 will be obtained dependent only upon the accuracy of the tracer 10 and the machine 12 itself and much more accurately than an operator could manually produce.

At the end of any particular line of travel or cutting operation, if it is desired to cut a succeeding line progressively into the workpiece 17, the stylus 22 may be moved in the reverse direction to move the cutting tool 16 in a rapid traverse motion in the reverse direction to the original point of the machining operation, and then the outer ring 36 may be released and rotated approximately 90° to allow freedom of movement of the stem 20 and tracer 10 in a lateral direction to offset the line of travel of the cutting tool 16. The outer ring 36 and the forked member 32 are then returned to their original position and locked thereat, such alignment being expedited by the visual estimation of position of the guide rod 74.

Another mode of operation for the tracer 10 is in a bias mode for pick feeding operations and the like. In this mode of operation, the stem 20 of the tracer 10 is mechanically biased in a desired direction by the bias control mechanism shown generally at 80 in FIG. 1 and including a bias control arm 78 for setting the desired angle of movement. A bias trigger 82 is also provided for readily releasing the action of the bias mechanism 80 under the control of the operator. In the type of tracer 10 shown in this environment of the invention, it is necessary to turn the override adjustment screw 25 to the full in position so that excessive spring bias is created in the sensing mechanism for switching into the rapid travel motion. Thus, even though the stem 20 is moved to its full extent of movement by the bias control mechanism 80, such displacement will cause insufficient pressure to trip the override mechanism for rapid traverse movement. This adjustment is inconvenient to the operator of the machine since he cannot readily move the slides of the machine in rapid traverse when it is desired to start a new traverse, for example, since he must first release a part of the spring tension provided by the override adjustment screw 25.

As pointed out previously in the description of the apparatus of the invention, a pin 76 depends from the circular block 70 affixed to the outer ring 36 and engages the bias control arm 78. By such an arrangement it is seen that in normal three-dimensional operation, rotation of the outer ring 36 and the lower forked member 32 to select a desired path of travel will rotate also the bias control mechanism 80 to the same angular position. In normal operation the bias control trigger 82 will be in the off position and the stylus 22 of the tracer 10 will be under the manual control of the operator. Now if it is desired to operate in a biased mode, i.e., where the operator is free to attend to other duties, the bias control trigger 82 need only be switched to the on condition thereby biasing the stem 20 in the desired direction. It will be seen that the bolt 66 in the lower forked member 32 may be adjusted to limit the displacement of the stylus so that a desired rate of travel is obtained, but whereat the override rapid traverse switching is prevented.

By means of the use of this apparatus of the invention, it is no longer necessary to turn the override adjustment screw 25 fully in to prevent against siwtching into rapid traverse and at the end of a particular machining pass, the operator may conveniently withdraw the cutting tool 16 by moving the bias control trigger 82 to the off position and by moving the stylus 22 in a reverse direction. Similarly, it is also seen that the direction of movement may be readily adjusted by releasing the clamping screw 50 and rotating the lower forked member 32 to the desired direction.

An added feature of this invention is the automatic biasing device 85 shown in FIG. 4. This biasing device 85 may be used in lieu of the bias control mechanism 80 and allows the use of the apparatus of the invention on tracer mechanisms which do not provide an internal bias control mechanism. Additionally, this arrangement facilitates manual actuation by the operator since it is closely adjacent the stylus 22 of the tracer 10.

The bias device 85 comprises a first link 86 of generally arcuate configuration pivotally mounted at one end between the prongs 64 of the lower forked member 32 on pin 87. Also pivotally mounted on the pin 87 is a cam locking lever 88 having an arcuate cam surface 89 and a raised portion 90 for facilitating grasping by the operator. Pivotally mounted on the second end of the link 86 is a support member 91 which has a leaf spring 92 riveted thereto. The leaf spring 92 at its upper end carries a U-shaped bracket 93 rotatably mounting a concave roller 94 which engages the stem 20 of the tracer 10 and allows upward and downward movement of the stem 20 relative to the forked member 32. When the cam lever 88 is moved to the left as viewed in FIG. 4, the arcuate surface 89 will engage a mating arcuate surface on the support member 91 urging the support member 91 toward the left and in turn urging the roller 94 into engagement with the stem 20 of the tracer. The resilient leaf spring 92 will bias the support member 91 in the opposite direction and will serve to maintain the support member 91, the cam lever 88 and the link 86 in a wedging arrangement. The leftward movement of the support member 91 and the roller 94 exerts sufficient force to urge the stem 20 into engagement with the stop screw 66, thereby causing movement of the machining tool 16 at a preselected rate as determined by the setting of the stop screw 66 under control of the tracer 10.

It will be apparent, then, that the bias device 85 may be readily activated by the operator by urging the cam lever 88 in a leftward direction, once a desired direction of movement of the tracer stem 20 has been selected by the orientation of the outer ring 36. Release of the bias device 85 is effected by movement of the cam lever 88 in righthand direction, the internal bias of the tracer 10 urging the stem 20 to a central position and moving the roller 94 and support member 91 to the right. Since the bias device 85 is carried by the forked member 32, it is always in the proper disposition with relation to the tracer stem 20 to urge the stem 20 against the stop screw 66 for the various selected directions of movement of the cutting tool 16 of the machine. Further, the bias device 85 does not interfere with manual intervention by the operator in the event that rapid traverse movement in the reverse direction becomes necessary. The stem 20 may be manually moved in a reverse direction overriding the bias of the leaf spring 92 without the necessity of unlocking the bias device 85 by releasing the cam lever 88. This allows the operator of the machine to have ultimate control over the tracer 10 requiring only the setting of direction and reverse motion to be manually performed, while the feeding traverse is automatically engaged by release of the stem 20 to perform the straight line machining operation.

Other modes of applying the principle of the invention may be employed, change being made as regards the details described, provided the features stated in any of the following claims or the equivalent of such be employed.

We, therefore, particularly point out and distinctly claim as our invention:

1. In combination with a machine tool tracing mechanism including a tracer from which a stem extends and mounts at its end a hand-operated stylus, a guiding attachment for such mechanism comprising a base member affixed to said tracer, a guide member spaced from the base member in the direction of the stylus and having a portion proximate to said stem, means for interconnecting the base and guide members to support the latter by the former, whereby the guide member moves with and is fixed relative to the tracer, and stop means carried by that portion of the guide member proximate to the stem to limit relative displacement of the stem in a given selected direction.

2. The combination set forth in claim 1, wherein the stop means is adjustable to vary the limit of relative displacement of the stem.

3. The combination set forth in claim 1, including means for rotatively adjusting the stop means about the stem to change the direction of the stem movement to be limited by the stop means.

4. The combination set forth in claim 3, wherein the stop means is also laterally adjustable relative to the stem to vary the limit of such displacement thereof.

5. The combination set forth in claim 4, wherein the guide member is of forked configuration having a pair of prongs which engage the stem on two sides to limit movement of the stem between the prongs.

6. The combination set forth in claim 5 further including bias means mounted on the guide member and engaging the stem to urge the stem to a displaced position within the prongs.

References Cited

UNITED STATES PATENTS

| 2,355,812 | 8/1944 | Martindell | 90—62 |
| 2,826,966 | 3/1958 | Lamielle | 90—62 |

GERALD A. DOST, Primary Examiner